US010202931B2

(12) United States Patent
Ito et al.

(10) Patent No.: US 10,202,931 B2
(45) Date of Patent: *Feb. 12, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Hisaki Ito, Gotenba (JP); Noriyuki Takada, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/617,145

(22) Filed: Jun. 8, 2017

(65) Prior Publication Data
US 2017/0356384 A1 Dec. 14, 2017

(30) Foreign Application Priority Data
Jun. 8, 2016 (JP) .................................. 2016-114546

(51) Int. Cl.
F02D 41/40 (2006.01)
F02M 61/04 (2006.01)
(Continued)

(52) U.S. Cl.
CPC .............. *F02D 41/405* (2013.01); *F02B 1/12* (2013.01); *F02B 23/0648* (2013.01);
(Continued)

(58) Field of Classification Search
CPC ........ F02B 1/12; F02B 23/06; F02B 23/0648; F02B 23/0669; F02B 23/0672;
(Continued)

(56) References Cited

U.S. PATENT DOCUMENTS 6,616,070 B1 * 9/2003 Kunkulagunta ..... F02M 45/086
239/533.11
6,758,407 B1 * 7/2004 Lambert ................... F02D 1/06
239/5
(Continued)

FOREIGN PATENT DOCUMENTS

EP 1 645 749 A1 4/2006
JP S59-147864 8/1984
(Continued)

OTHER PUBLICATIONS

Office Action issued in U.S. Appl. No. 15/817,173 dated May 8, 2018.
(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

An internal combustion engine includes a piston and a fuel injection valve. The fuel injection valve includes a first injection hole, a second injection hole, a first needle configured to open and close the first injection hole, and a second needle configured to open and close the second injection hole. The first injection hole and the second injection hole are configured such that a portion of a fuel spray injected from the first injection hole and a portion of a fuel spray injected from the second injection hole overlap each other at a position apart at a predetermined distance from a side wall of a cavity of the piston. The second needle is configured to start operation in order to open the second injection hole after a predetermined time has elapsed from a point of time when the first needle starts operation in order to open the first injection hole.

5 Claims, 10 Drawing Sheets

(51) Int. Cl.
*F02B 1/12* (2006.01)
*F02F 3/26* (2006.01)
*F02M 61/10* (2006.01)
*F02M 61/18* (2006.01)
*F02M 45/08* (2006.01)
*F02B 23/06* (2006.01)
*F02D 41/38* (2006.01)

(52) U.S. Cl.
CPC ........ *F02B 23/0669* (2013.01); *F02D 41/402* (2013.01); *F02F 3/26* (2013.01); *F02M 45/086* (2013.01); *F02M 61/045* (2013.01); *F02M 61/10* (2013.01); *F02M 61/182* (2013.01); *F02M 61/1813* (2013.01); *F02B 23/0672* (2013.01); *F02B 23/0696* (2013.01); *F02D 2041/389* (2013.01); *F02M 2200/46* (2013.01); *Y02T 10/44* (2013.01)

(58) Field of Classification Search
CPC .. F02B 23/0696; F02D 41/402; F02D 41/405; F02D 2041/389; F02M 61/18; F02M 61/1813; F02M 61/182; F02M 61/10; F02M 61/045; F02M 2200/46; F02M 45/086; Y02T 10/44
USPC .......... 123/294–299, 445, 490; 701/102–105
See application file for complete search history.

(56) References Cited

U.S. PATENT DOCUMENTS

| | | | | |
|---|---|---|---|---|
| 7,309,029 | B2* | 12/2007 | Boecking | F02M 45/086 123/304 |
| 7,523,875 | B2* | 4/2009 | Cooke | F02M 45/086 239/44 |
| 9,562,505 | B2* | 2/2017 | Hokkanen | F02M 63/029 |
| 2002/0000483 | A1* | 1/2002 | Shoji | F02B 23/0669 239/533.2 |
| 2003/0217732 | A1* | 11/2003 | Kataoka | F02B 1/12 123/276 |
| 2008/0053408 | A1 | 3/2008 | Futonagane et al. | |
| 2009/0045269 | A1* | 2/2009 | Shimo | F02M 45/086 239/585.5 |
| 2012/0323468 | A1 | 12/2012 | Miyaura et al. | |
| 2017/0356383 | A1* | 12/2017 | Ito | F02M 61/1813 |

FOREIGN PATENT DOCUMENTS

| | | |
|---|---|---|
| JP | S61-218772 A | 9/1986 |
| JP | 8-254123 | 10/1996 |
| JP | H09-236067 A | 9/1997 |
| JP | 2000-64928 | 3/2000 |
| JP | 2004-068726 A | 3/2004 |
| JP | 2006-274841 A | 10/2006 |
| JP | 2007-231852 A | 9/2007 |
| JP | 2010-223166 | 10/2010 |
| JP | 2011-190725 A | 9/2011 |
| JP | 2013-024197 A | 2/2013 |
| JP | 2013-204455 | 10/2013 |
| JP | 2014-194158 A | 10/2014 |
| WO | WO 2006/104232 A2 | 10/2006 |

OTHER PUBLICATIONS

Notice of Allowance issued in U.S. Appl. No. 15/617,173 dated Oct. 10, 2018.

* cited by examiner

INTERNAL COMBUSTION ENGINE

INCORPORATION BY REFERENCE

The disclosure of Japanese Patent Application No. 2016-114546 filed on Jun. 8, 2016 including the specification, drawings and abstract is incorporated herein by reference in its entirety.

BACKGROUND

1. Technical Field

The present disclosure relates to an internal combustion engine.

2. Description of Related Art

In an fuel injection valve in which a plurality of injection holes are arranged on upper and lower sides, a technique of promoting atomization of fuel by making a central axis of an upper injection hole and a central axis of a lower injection hole intersect each other at a comparatively near position from the fuel injection valve is known (for example, refer to Japanese Patent Application Publication No. 2000-064928 (JP 2000-064928 A)).

SUMMARY

If fuel sprays intersect each other at a comparatively near position from the fuel injection valve, there is a concern that the particles of fuel injected from the respective injection holes may join together and the particle diameter of the fuel may become large. Since fuel is injected from the vicinity of a central axis of a combustion chamber and the fuel sprays intersect each other in the vicinity of the central axis of the combustion chamber, the concentration of the fuel in the vicinity of the central axis of the combustion chamber becomes high and oxygen runs short locally. Accordingly, there is also a concern that soot may be generated. Particularly, if fuel is injected into a high-temperature combustion chamber, the temperature of the fuel rises immediately. Accordingly, combustion starts comparatively early. Hence, combustion starts at a timing at which the mixing between fuel and air is not sufficient, and oxygen runs short locally. Accordingly, there is a concern that soot may be generated.

The present disclosure provides an internal combustion engine that promotes the mixing between fuel and air to suppress generation of soot.

The internal combustion engine according to one aspect of the present disclosure includes a piston and a fuel injection valve. The piston includes a cavity configured to cause the internal combustion engine perform compression self-ignition combustion. The fuel injection valve is configured to inject fuel toward a side wall of the cavity. The fuel injection valve includes a first injection hole for injecting fuel, a second injection hole for injecting fuel, a first needle configured to open and close the first injection hole, and a second needle configured to open and close the second injection hole. The first injection hole and the second injection hole are configured such that a portion of a fuel spray injected from the first injection hole and a portion of a fuel spray injected from the second injection hole overlap each other at a position apart at a predetermined distance from the side wall of the cavity. The second needle is configured to start operation in order to open the second injection hole after a predetermined time has elapsed from a point of time when the first needle starts operation in order to open the first injection hole.

If fuel is injected from the second injection hole after fuel is injected from the first injection hole, the temperature on the tip side of the fuel spray from the first injection hole first rises to a temperature at which ignition is allowed. If the fuel spray from the second injection hole that has come later overlaps a place where combustion is not started yet nearer to a rear end side than a tip side of the fuel spray from the first injection hole before the combustion of the fuel spray from the first injection hole is expanded, a rise in the temperature of the fuel spray from the first injection hole is mitigated due to the evaporation latent heat of the fuel injected from the second injection hole. Hence, the timing at which the combustion of the fuel injected from the first injection hole is expanded can be delayed. Then, since combustion is expanded in a state where the mixing between fuel and air is promoted, local expansion of the combustion in a state where oxygen concentration is low can be suppressed. Therefore, generation of soot can be suppressed. The predetermined distance herein is a distance comparatively close to the side wall of the cavity, and can be a distance from the side wall of the cavity to a position where the combustion of the fuel injected from the first injection hole starts. This predetermined distance can also be 0 or approximately 0. The predetermined time that is a time from the point of time when the first needle starts operation to a point of time when the second needle starts operation is a time set such that the portion of the fuel spray from the first injection hole and the portion of the fuel spray from the second injection hole overlap each other at the predetermined distance from the side wall of the cavity, and is a time for which the expansion of the combustion of the fuel injected from the first injection hole can be suppressed by the fuel injected from a second injection hole. By forming the first injection hole and the second injection hole at the position apart at the predetermined distance from the side wall of the cavity such that a central axis of the first injection hole and a central axis of the second injection hole intersect each other, the portion of the fuel spray injected from the first injection hole and the portion of the fuel spray injected from the second injection hole may overlap each other at the position apart at the predetermined distance from the side wall of the cavity.

In the internal combustion engine according to the above aspect, the first injection hole and the second injection hole may be configured such that a ratio of the amount of fuel that faces a top part side of the piston and the amount of fuel that faces a bottom part side of the piston becomes a predetermined ratio after the fuel sprays hit the side wall of the cavity.

Air is supplied from a squish area to the top part side of the piston in the cavity. That is, as the portion of the fuel spray faces the top part side of the piston, the air from the squish area and fuel can be mixed together. Therefore, the mixing between fuel and air can be further promoted until the combustion of the fuel is expanded. For this reason, generation of soot can be suppressed. The predetermined ratio may be a ratio in which generation of soot can be suppressed. By forming the first injection hole and the second injection hole such that the amount of fuel according to the volume of air supplied from the squish area faces the top part side of the piston, the mixing between air and fuel may be promoted utilizing the air from the squish area more effectively.

The internal combustion engine related to the above aspect may further include an electronic control unit configured to control the operation of the first needle and the second needle such that fuel injection from the fuel injection valve is carried out in a divided manner into fuel injection from the first injection hole and fuel injection from the second injection hole. The electronic control unit may be configured to control the operation of the first needle and the second needle so as to start the operation of the second needle in order to open the second injection hole after the predetermined time has elapsed from a point of time when the first needle starts operation in order to open the first injection hole.

That is, the electronic control unit controls the first needle and the second needle, so that fuel can be injected from the second injection hole at a timing at which expansion of the combustion of the fuel injected from the first injection hole can be suppressed. Accordingly, generation of soot can be suppressed.

In the internal combustion engine related to above aspect, the electronic control unit may be configured to control the first needle and the second needle so as to perform main injection, and after-injection that is fuel injection after the main injection is performed, from the fuel injection valve. The electronic control unit may be configured to control the first needle and the second needle so as to perform the main injection in a divided manner into the fuel injection from the first injection hole and the fuel injection from the second injection hole. The electronic control unit may be configured to control the operation of the first needle and the second needle so as to start the operation of the second needle in order to open the second injection hole after the predetermined time has elapsed from a point of time when the first needle starts operation in order to open the first injection hole in the main injection.

That is, by controlling the first needle and the second needle when the main injection is carried out from the first injection hole and the second injection hole, fuel can be injected from the second injection hole at a timing at which expansion of the combustion of the fuel injected from the first injection hole can be suppressed. The predetermined main delay time is a time set such that the portion of the fuel spray from the first injection hole and the portion of the fuel spray from the second injection hole overlap each other at the predetermined distance from the side wall of the cavity, at the time of the main injection, and is a time for which the expansion of the combustion of the fuel injected from the first injection hole can be suppressed by the fuel injected from a second injection hole, at the time of the main injection.

In the internal combustion engine related to above aspect, the electronic control unit may be configured to control the first needle and the second needle so as to perform main injection, and after-injection that is fuel injection after the main injection is performed, from the fuel injection valve. The electronic control unit may be configured to control the first needle and the second needle so as to perform the after-injection in a divided manner into the fuel injection from the first injection hole and the fuel injection from the second injection hole. The electronic control unit may be configured to control the operation of the first needle and the second needle so as to start the operation of the second needle in order to open the second injection hole after the predetermined time has elapsed from a point of time when the first needle starts operation in order to open the first injection hole in the after-injection.

That is, by controlling the first needle and the second needle when the after-injection is carried out from the first injection hole and the second injection hole, fuel can be injected from the second injection hole at a timing at which expansion of the combustion of the fuel injected from the first injection hole can be suppressed. The predetermined after-delay time is a time set such that the portion of the fuel spray from the first injection hole and the portion of the fuel spray from the second injection hole overlap each other at the predetermined distance from the side wall of the cavity, at the time of the after-injection, and is a time for which the expansion of the combustion of the fuel injected from the first injection hole can be suppressed by the fuel injected from a second injection hole, at the time of the after-injection.

According to the internal combustion engine related to the above aspect, generation of soot can be suppressed by promoting the mixing between fuel and air.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, modes for carrying out the present disclosure will be illustratively described in detail on the basis of embodiments with reference to the drawings. It is noted herein that the dimensions, materials, shapes, relative arrangements, and the like of component parts described in the embodiments are not meant to limit the range of the present disclosure only to these particularly so long as there is no description.

(Embodiment 1)

Figure 1:
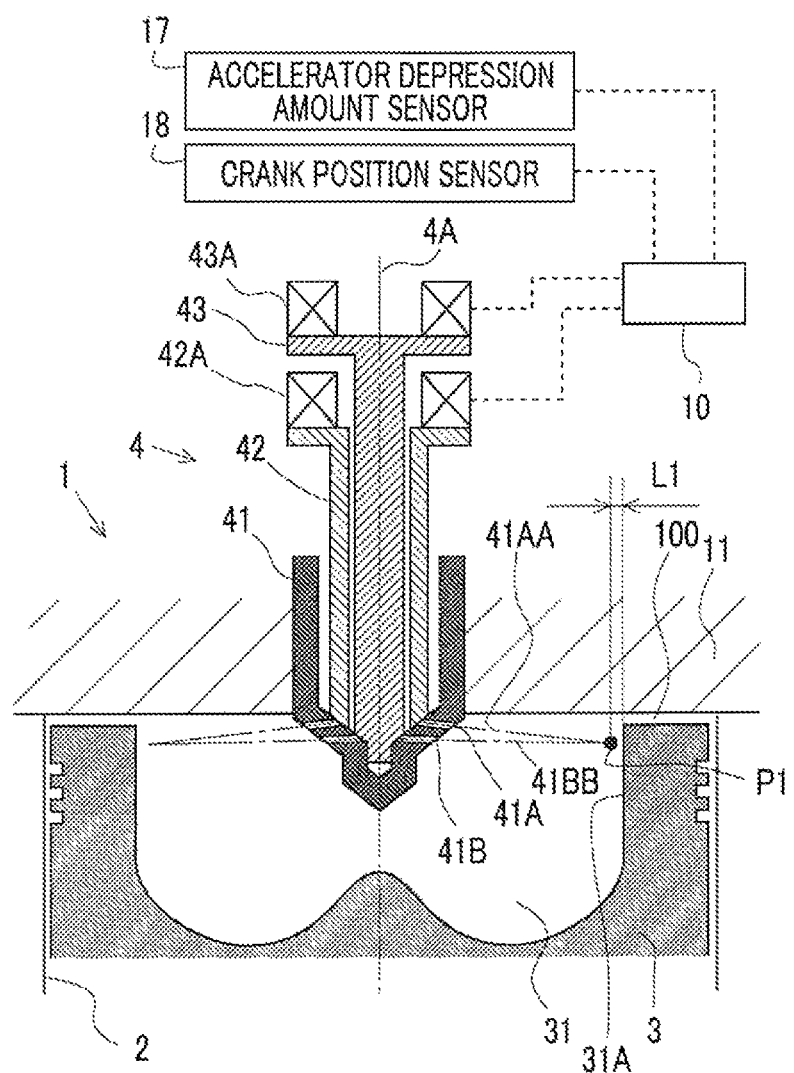
FIG. 1 is a sectional view of an internal combustion engine 1 related to an embodiment.

FIG. 1 is a sectional view of an internal combustion engine 1 related to the present embodiment. A cylinder 2 of the internal combustion engine 1 is equipped with a piston 3. In the present embodiment, the display of some configuration elements are omitted in order to display the internal combustion engine 1 simply. The internal combustion engine 1 is, for example, a diesel engine that performs compression self-ignition combustion. The internal combustion engine 1 is mounted on, for example, a vehicle. A cavity 31 that is recessed from a top part of a piston 3 toward the inside of the piston 3 is formed in the piston 3. The cavity 31 of the piston 3 is configured so as to make the internal combustion engine perform self-ignition combustion. When the piston 3 is located in the vicinity of a top dead center, a squish area 100 is formed between the top part of the piston 3 and a cylinder head 11.

Figure 2:
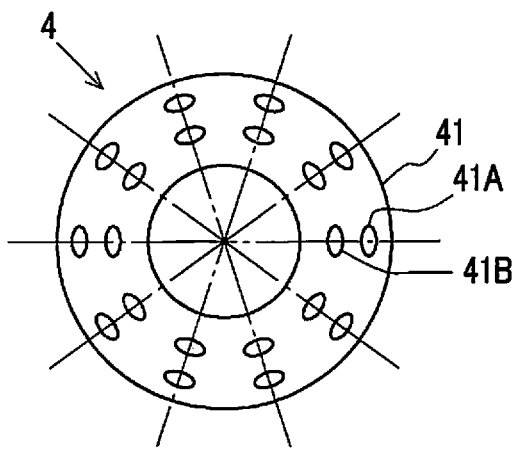
FIG. 2 is a view of a fuel injection valve as seen from a piston side.

The cylinder head 11 of the internal combustion engine 1 is provided with a fuel injection valve 4 that injects fuel directly into the cylinder 2. Here, FIG. 2 is a view of the fuel injection valve 4 as seen from the piston 3 side. A plurality of first injection holes 41A and a plurality of second injection holes 41B are provided at equal angles about a central axis 4A of the fuel injection valve 4 on a tip side of a main body 41 of the fuel injection valve 4. In addition, the central axis 4A of the fuel injection valve 4 coincides with a central axis of the cylinder 2. The second injection holes 41B are formed closer to the tip side of the fuel injection valve 4 and closer to a central axis 4A side of the fuel injection valve 4 than the first injection holes 41A. The first injection holes 41A and the second injection holes 41B are provided by the same numbers, and one of the first injection holes 41A and one of the second injection holes 41B nearest to this first injection hole 41A are arranged as a pair of injection holes. The first injection hole 41A and the second injection hole 41B that form the pair of injection holes are arranged on the same plane passing through the central axis 4A of the fuel injection valve 4.

The fuel injection valve 4 is provided with an outer needle 42 that opens and closes the first injection hole 41A, and an inner needle 43 that opens and closes the second injection hole 41B. The outer needle 42 is moved forward and backward by an outer needle valve gear 42A, and the inner needle 43 is moved forward and backward by an inner needle valve gear 43A. The outer needle valve gear 42A and the inner needle valve gear 43A are equipped with, for example, piezoelectric elements, and the outer needle 42 and the inner needle 43 are separately lifted by separately energizing the piezoelectric elements. In the present embodiment, the outer needle 42 is equivalent to the first needle in the present disclosure, and the inner needle 43 is equivalent to the second needle in the present disclosure.

When the piston 3 is in the vicinity of the top dead center, the first injection hole 41A and the second injection hole 41B are formed such that a portion of a spray of fuel injected from the first injection hole 41A and a portion of a spray of fuel injected from the second injection hole 41B making a pair with the first injection hole 41A overlap each other at a position with a predetermined distance L1 from a side wall 31A of the cavity 31. The predetermined distance L1 is a range that can be said to be the vicinity of the side wall 31A. In order to overlap portions of the fuel sprays each other at such a position, the first injection hole 41A and the second injection hole 41B are formed such that a central axis 41AA of the first injection hole 41A and a central axis 41BB of the second injection hole 41B intersect each other at a point P1 (hereinafter, referred to as an intersection P1) with the predetermined distance L1 from the side wall 31A of the cavity 31.

In addition, in the present embodiment, the portion of the spray of the fuel injected from the first injection hole 41A and the portion of the spray of the fuel injected from the second injection hole 41B have only to overlap each other in the vicinity of the side wall 31A of the cavity 31. Therefore, the intersection P1 may be on the side wall 31A. That is, the predetermined distance L1 may be set as 0. Additionally, in the present embodiment, the central axis 41AA of the first injection hole 41A and the central axis 41BB of the second injection hole 41B intersect each other at the intersection P1. However, since the portion of the spray of the fuel injected from the first injection hole 41A and the portion the spray of the fuel injected from the second injection hole 41B have only to overlap each other at the position with the predetermined distance L1 from the side wall 31A of the cavity 31, the central axis 41AA of the first injection hole 41A and the central axis 41BB of the second injection hole 41B do not necessarily intersect each other.

The ECU 10 that is an electronic control unit for controlling the internal combustion engine 1 is provided as an annex in the internal combustion engine 1 configured as described above. The ECU 10 controls the internal combustion engine 1 according to the operation conditions of the internal combustion engine 1 or driver's requests. An accelerator depression amount sensor 17 that outputs an electrical signal according to an amount by which the driver steps on an accelerator pedal and detects an engine load, and a crank position sensor 18 that detects an engine rotation speed are connected to the ECU 10 via electrical wiring lines, and output signals of these various sensors are input to the ECU 10.

Meanwhile, the outer needle valve gear 42A and the inner needle valve gear 43A are connected to the ECU 10 via electrical wiring lines, and these devices are controlled by the ECU 10. If a command signal is supplied from the ECU 10 to the outer needle valve gear 42A, the outer needle 42 ascends, and thereby, the outer needle 42 moves in a direction in which the first injection hole 41A is opened. On the other hand, if the supply of the command signal from the ECU 10 to the outer needle valve gear 42A is stopped, the outer needle 42 descends, and thereby, the outer needle 42 moves in a direction in which the first injection hole 41A is closed. Similarly, if a command signal is supplied from the ECU 10 to the inner needle valve gear 43A, when the inner needle 43 ascends, and thereby, the inner needle 43 moves in a direction in which the second injection hole 41B is opened. On the other hand, if the supply of the command signal from the ECU 10 to the inner needle valve gear 43A is stopped, the inner needle 43 descends, and thereby, the inner needle 43 moves in a direction in which the second injection hole 41B is closed.

The ECU 10 determines the fuel injection amount and the timing of fuel timing from the fuel injection valve 4 on the basis of the operational state (for example, the engine rotation speed and the accelerator depression amount) of the internal combustion engine 1. A relationship between the operational state of the internal combustion engine 1, and the amounts of fuel injection and the timings of fuel injection from the first injection hole 41A and the second injection hole 41B are obtained and mapped in advance by experiment or the like, and are stored in the ECU 10. The map of the fuel injection amounts is set such that an air-fuel ratio within a cylinder becomes a target air-fuel ratio, and this target air-fuel ratio is set according to the operational state of the internal combustion engine 1.

Figure 3:
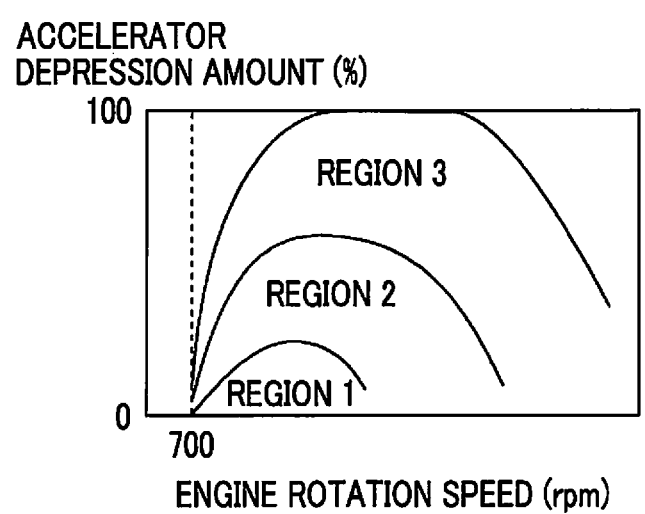
FIG. 3 is a view illustrating a relationship between an engine rotation speed and an accelerator depression amount.

The ECU 10 carries out, for example, main injection, pilot injection, and after-injection, according to the operational state of the internal combustion engine 1. The pilot injection is fuel injection performed before the main injection, and the after-injection is fuel injection performed after the main injection. FIG. 3 is a view illustrating a relationship between the engine rotation speed and the accelerator depression amount. Region 1 is an operating region where the engine rotation speed or the accelerator depression amount is moderate, and for example, the pilot injection and the main injection are carried out in this region. Region 2 is an operating region where the engine rotation speed or the accelerator depression amount is comparatively small, and for example, the pilot injection, the main injection, and the after-injection are carried out in this region. Region 3 is an operating region where the engine rotation speed or the accelerator depression amount is comparatively large, and for example, the pilot injection and the main injection are carried out in this region.

Figure 4:
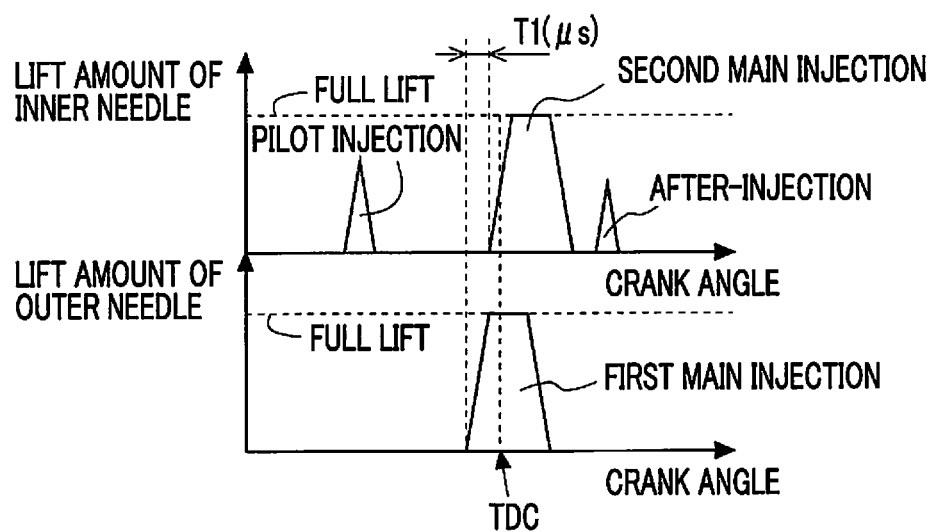
FIG. 4 is a view illustrating a relationship between the lift amounts of an outer needle and an inner needle, and a crank angle, related to Embodiment 1.

FIG. 4 is a view illustrating a relationship between the lift amounts of the outer needle 42 and the inner needle 43 and the crank angle related to the present embodiment. FIG. 4 illustrates a case where the pilot injection, the main injection, and the after-injection are carried out in Region 2. "Full lifts" are lift amounts in a case where the lift amounts of the outer needle 42 and the inner needle 43 becomes the largest, respectively. The inner needle 43 corresponds to the pilot injection, the main injection, and the after-injection, and the outer needle 42 corresponds to only the main injection. That is, although the main injection is carried out from both the first injection hole 41A and the second injection hole 41B, the pilot injection and the after-injection are carried out only from the second injection hole 41B. In the present embodiment, the lift amount of the outer needle 42 starts to increase before a point of time when the lift amount of the inner needle 43 starts to increase in the main injection. A time difference of points of time when the lift amounts of the inner needle 43 and the outer needle 42, respectively, in this main injection start to increase is illustrated by T1 in FIG. 4. The time difference T1 is illustrated not as a difference of the crank angle but as a difference of time. The time difference T1 in the embodiment is equivalent to a predetermined time or a predetermined main delay time in the present disclosure. In the following, the main injection from the first injection hole 41A is referred to as a first main injection, and the main injection from the second injection hole 41B is referred to as a second main injection.

Here, in Region 2, the combustion of fuel related to the main injection starts at a comparatively early timing if the main injection is carried out because the temperature within the cylinder 2 is high. Therefore, the combustion of fuel related to the main injection can be expanded at a comparatively early timing. In this case, since the combustion is expanded when the mixing between fuel and air is still insufficient, fuel is combusted in a state where oxygen runs short in a place where fuel concentration is high. If so, there is a concern that soot may be generated by local oxygen shortage. Meanwhile, in the present embodiment, in order to suppress expansion of the combustion of fuel related to the main injection at a comparatively early timing, when the piston 3 is in the vicinity of the top dead center, the first injection hole 41A and the second injection hole 41B are formed such that the portion of the spray of fuel injected from the first injection hole 41A and the portion of the spray of fuel injected from the second injection hole 41B making a pair with the first injection hole 41A overlap each other at a position with the predetermined distance L1 from the side wall 31A of the cavity 31, and fuel injection is carried out from the first injection hole 41A and the second injection hole 41B by providing the time difference T1 related to FIG. 4 at the time of the main injection. In the present embodiment, before the combustion of fuel by the first main injection is expanded from a tip part of a fuel spray, the pair of injection holes are formed such that a portion of a fuel spray formed by the second main injection and a portion of a fuel spray formed by the first main injection overlap each other, and the time difference T1 is provided by injecting fuel. Therefore, in a place where the fuel sprays overlap each other, the temperature of the fuel spray formed by the first main injection falls due to the evaporation latent heat of the fuel by the second main injection. For this reason, expansion of combustion at a comparatively early timing can be suppressed. Additionally, since the fuel spray formed by the second main injection overlaps the fuel spray formed by the first main injection in the middle of evaporation in a place other than the place where combustion is started, the combustion of fuel by second main injection is suppressed due to the evaporation latent heat of the fuel spray formed by the first main injection. Moreover, since the fuel spray formed by the first main injection and the fuel spray formed by the second main injection do not overlap each other up to a position where the fuel spray formed by the first main injection starts combustion, both the fuel sprays can be mixed with more air, respectively. Thus, the mixing between fuel and air is promoted. Since both the fuel sprays do not overlap each other up to the position with the predetermined distance L from the side wall 31A of the cavity 31, it is possible to suppress a situation in which the particle diameter of fuel becomes large. In this way, since the time until combustion is expanded can be extended, the mixing between fuel by the first main injection and the second main injection, and air can be promoted during that time. Hence, since combustion is expanded in a state where the mixing between fuel and air proceeds, generation of soot can be suppressed.

Figure 5:
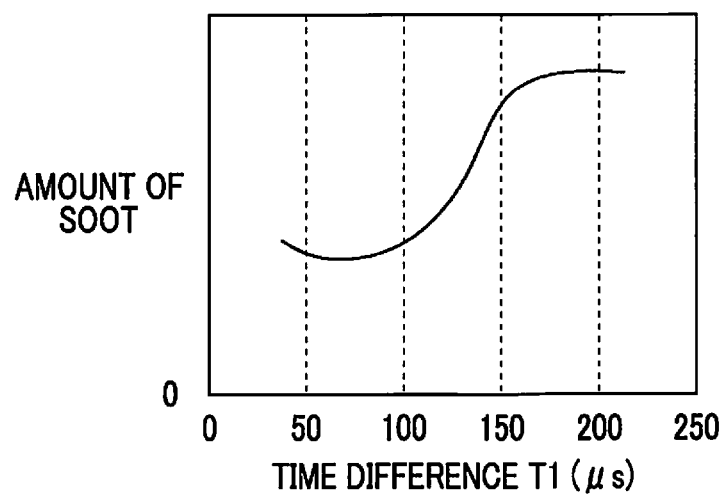
FIG. 5 is a view illustrating a relationship between the amount of soot generated, and a time difference T1.

FIG. 5 is a view illustrating a relationship between the amount of soot generated, and the time difference T1. For example, a reduction effect of soot is seen in 130 μs or less. Hence, the discharge amount of soot can be reduced by setting the time difference T1 to, for example, 130 μs or less. However, if the time difference T1 is too short as illustrated in FIG. 5, the amount of soot can be increased on the contrary. For this reason, an optimum value of the time difference T1 is obtained by experiment or simulation. Here, the easiness of combustion of fuel varies according to the operational state of the internal combustion engine 1 and the cetane number of fuel. Hence, the optimum value of the time difference T1 can vary depending on the operational state of the internal combustion engine 1 and the cetane number of fuel. Thus, in the present embodiment, the time difference T1 is obtained in association with the operational state (accelerator depression amount) of the internal combustion engine 1 and the cetane number of fuel.

Figure 6:
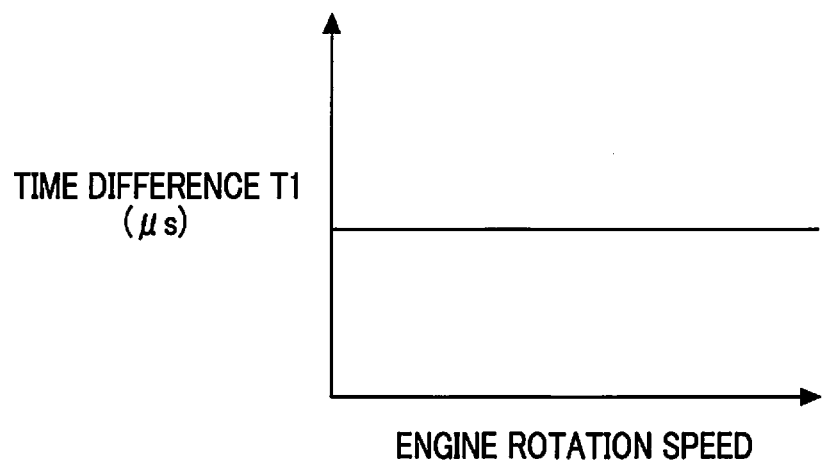
FIG. 6 is a view illustrating a relationship between the engine rotation speed and the time difference T1.
Figure 7:
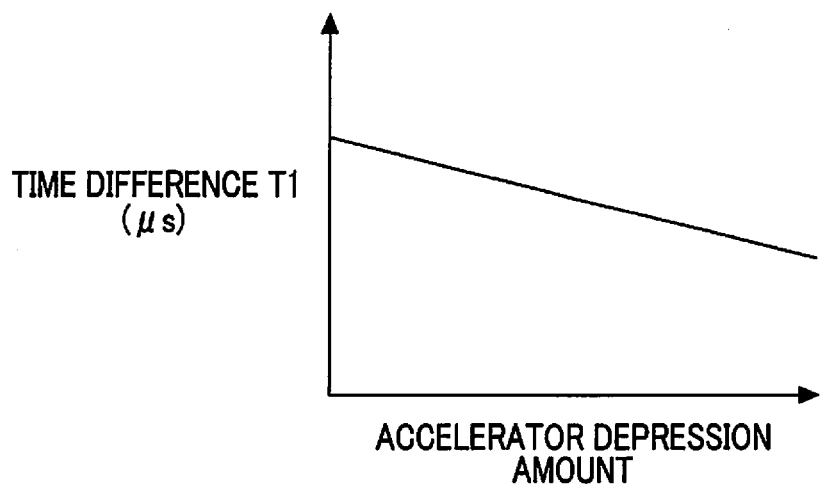
FIG. 7 is a view illustrating a relationship between the accelerator depression amount and the time difference T1.
Figure 8:
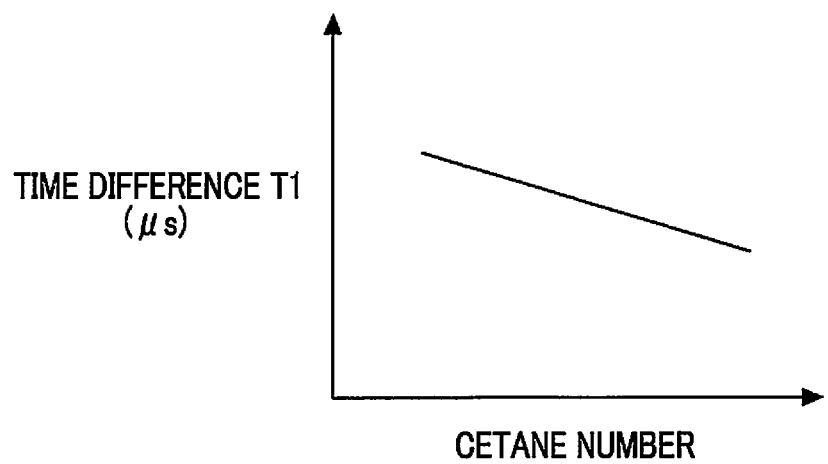
FIG. 8 is a view illustrating a relationship between the cetane number of fuel and the time difference T1.

FIG. 6 is a view illustrating a relationship between the engine rotation speed and the time difference T1. Since the easiness of combustion of fuel (the easiness of self-ignition) hardly varies even if the engine rotation speed has varied, the time difference T1 is not changed depending on the engine rotation. FIG. 7 is a view illustrating a relationship between the accelerator depression amount and the time difference T1. Since the temperature within the cylinder 2 becomes higher as the accelerator depression amount becomes larger, the time from the main injection to the start of combustion can be shortened. Hence, the time difference T1 is made smaller as the accelerator depression amount is larger. FIG. 8 is a view illustrating a relationship between the cetane number of fuel and the time difference T1. Since fuel is more easily ignited as the cetane number is larger, the time from the main injection to the start of combustion can be shortened. Hence, the time difference T1 is made smaller as the cetane number is larger. The relationship between the accelerator depression amount and the cetane number, and the time difference T1 is obtained in advance by experiment or simulation, and is stored in the ECU 10. Since it is considered that the value of the cetane number is determined depending on areas, the cetane number of fuel assumed to be supplied depending on areas may be set in advance.

Figure 9:
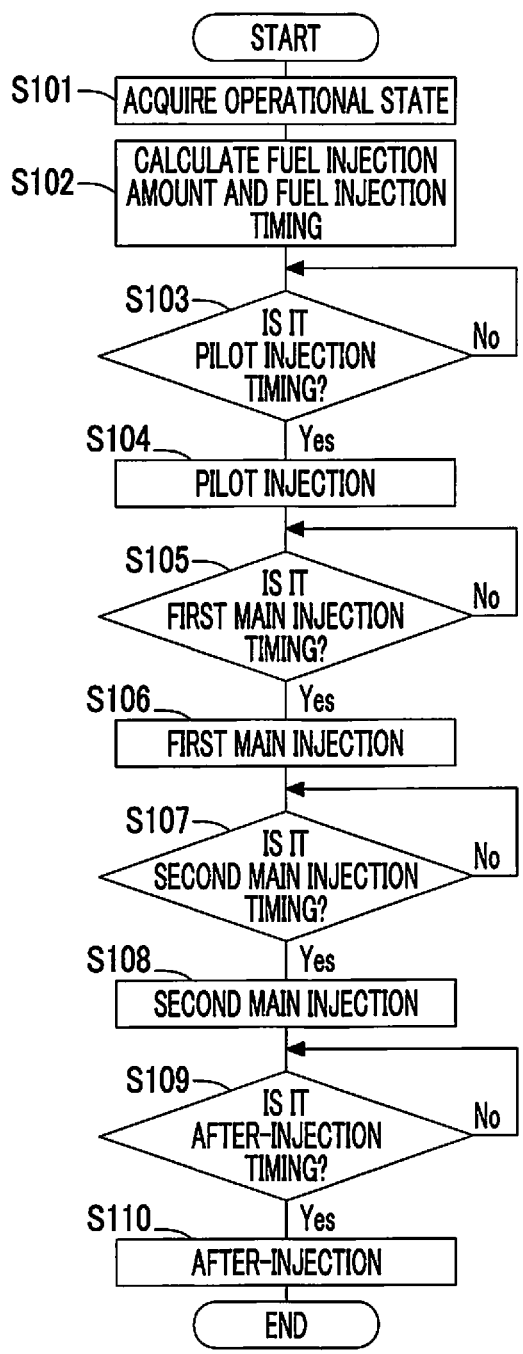
FIG. 9 is a flowchart illustrating a control flow of fuel injection related to Embodiment 1.

FIG. 9 is a flowchart illustrating a control flow of fuel injection related to the present embodiment. The flowchart is executed in each cycle of each cylinder 2 by the ECU 10 in Region 2.

In Step S101, the operational state of the internal combustion engine 1 is acquired. The ECU 10 acquires the accelerator depression amount obtained on the basis of the output signal of the accelerator depression amount sensor 17, and the engine rotation speed obtained on the basis of the output signal of the crank position sensor 18. These are used when obtaining fuel injection amounts and fuel injection timings.

In Step S102, on the basis of the operational state of the internal combustion engine 1, a pilot injection amount that is a fuel injection amount at the time of the pilot injection, a first main injection amount that is a fuel injection amount at the time of the first main injection, a second main injection amount that is a fuel injection amount at the time of the second main injection, an after-injection amount that is a fuel injection amount at the time of the after-injection are calculated, and a pilot injection timing that is a timing for starting the pilot injection, a first main fuel injection timing that is a timing for starting the first main injection, and an after-injection timing that is a timing for starting the after-injection are calculated. Maps or calculation formulas for obtaining the pilot injection amount, the pilot injection timing, the first main injection amount, the first main fuel injection timing, the after-injection amount, and the after-injection timing, respectively, on the basis of the operational state of the internal combustion engine 1 are obtained by experiment or simulation and are stored in advance in the ECU 10. The second main fuel injection timing that is the timing for starting the second main injection is calculated by adding the aforementioned time difference T1 to the first main fuel injection timing. In addition, the first main injection amount and the second main injection amount may be the same amounts or may be different amounts. Since these maps or calculation formulas change depending on the operating regions of the internal combustion engine 1, maps or calculation formulas corresponding to Region 2 are used in this Step S102.

In Step S103, it is determined whether or not it is the pilot injection timing. In a case where the determination is positive in Step S103, the processing proceeds to Step S104 where the pilot injection is carried out. Since the pilot injection is carried out from the second injection hole 41B, the ECU 10 gives a command signal to the inner needle valve gear 43A for a time according to the pilot injection amount. On the other hand, in a case where the determination is negative in Step S103, Step S103 is executed again.

In Step S105, it is determined whether or not there is the first main fuel injection timing. In a case where the determination is positive in Step S105, the processing proceeds to Step S106 where the first main injection is carried out. Since the first main injection is carried out from the first injection hole 41A, the ECU 10 gives a command signal to the outer needle valve gear 42A for a time according to the first main injection amount. On the other hand, in a case where the determination is negative in Step S105, Step S105 is executed again.

In Step S107, it is determined whether or not there is the second main fuel injection timing. In a case where the determination is positive in Step S107, the processing proceeds to Step S108 where the second main injection is carried out. Since the second main injection is carried out from the second injection hole 41B, the ECU 10 gives a command signal to the inner needle valve gear 43A for a time according to the second main injection amount. On the other hand, in a case where the determination is negative in Step S107, Step S107 is executed again.

In Step S109, it is determined whether or not there is the after-injection timing. The after-injection timing is obtained in advance by experiment or simulation in association with the operational state of the internal combustion engine 1, and is stored in the ECU. In a case where the determination is positive in Step S109, the processing proceeds to Step S110 where the after-injection is carried out. Since the after-injection is carried out from the second injection hole 41B, the ECU 10 gives a command signal to the inner needle valve gear 43A for a time according to the after-injection amount. On the other hand, in a case where the determination is negative in Step S109, Step S109 is executed again.

In addition, in the present embodiment, the pilot injection is performed from the second injection hole 41B. Instead of this, however, the pilot injection may be carried out from the first injection hole 41A. In addition, in the present embodiment, the after-injection is performed from the second injection hole 41B. Instead of this, however, the after-injection may be carried out from the first injection hole 41A. Additionally, in the present embodiment, the first main injection is performed before the second main injection. However, the second main injection may be performed before the first main injection by changing the order. However, by changing an injection hole for performing the main injection first to an injection hole for performing the pilot injection as illustrated in FIG. 4, reception of the influence of pulsation of fuel generated at the time of the pilot injection at the time of the main injection can be suppressed. Therefore, this is even better.

As described above, according to the present embodiment, expansion of combustion at an early stage can be suppressed by shifting the first main injection and the second main injection such that the portion of the fuel spray of the first main injection and the portion of the fuel spray of the second main injection overlap each other at the position apart by the predetermined distance L1 from the side wall 31A of the cavity 31. Therefore, combustion can be expanded after the mixing between fuel and air has proceeded. Accordingly, generation of soot can be suppressed.

(Embodiment 2)

In the present embodiment, in Region 2, the after-injection is performed in a divided manner from the first injection hole 41A and the second injection hole 41B. Additionally, the main injection is performed only from the second injection hole 41B. Since the other devices are the same as those of Embodiment 1, the description thereof is omitted.

In the following, an after-injection from the first injection hole 41A is referred to as a first after-injection, and an after-injection from the second injection hole 41B is referred to as a second after-injection. Additionally, a timing for starting the after-injection from the first injection hole 41A is referred to as a first after-injection timing, and a timing for starting the after-injection from the second injection hole 41B is referred to as a second after-injection timing. Additionally, a fuel injection amount at the time of the first after-injection is referred to as a first after-injection amount, and a fuel injection amount at the time of the second after-injection is referred to as a second after-injection amount. In the present embodiment, a time difference T2 is provided between the first after-injection timing and the second after-injection timing. That is, a time difference of points of time when the lift amounts of the inner needle 43 and the outer needle 42, respectively, in the after-injection start to increase is defined as T2. The time difference T2 in the embodiment is equivalent to a predetermined time or a predetermined after-delay time in the present disclosure. Since the temperature within the cavity 31 is rising due to the combustion of fuel by the main injection at the time of the after-injection, the fuel based on the after-injection is more easily combusted than the fuel based on the main injection. The time difference T2 is set in light of this point.

Figure 10:
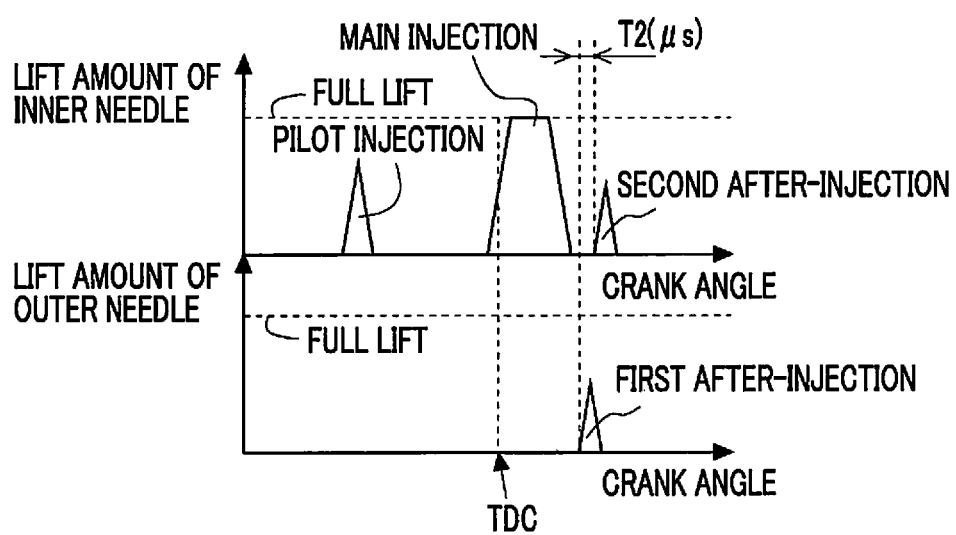
FIG. 10 is a view illustrating a relationship between the lift amounts of the outer needle and the inner needle and, the crank angle related to Embodiment 2.

FIG. 10 is a view illustrating a relationship between the lift amounts of the outer needle 42 and the inner needle 43 and, the crank angle related to the present embodiment. The lift amount of the inner needle 43 increases in response to the pilot injection, the main injection, and the second after-injection, and the lift amount of the outer needle 42 increases in response to the first after-injection. That is, although the after-injection is carried out from both the first injection hole 41A and the second injection hole 41B, the pilot injection and the main injection are carried out only from the second injection hole 41B. In the present embodiment, the lift amount of the outer needle 42 starts to increase before the lift amount of the inner needle 43 starts to increase in the after-injection. A time difference of points of time when the lift amounts of the inner needle 43 and the outer needle 42, respectively, in the after-injection start to increase is T2.

Here, since the fuel based on the after-injection is combusted, there is a concern that soot may be generated if the fuel is combusted before mixing with air proceeds. Hence, a timing at which the combustion of the first after-injection is expanded can be delayed by suppressing the combustion of the fuel spray formed by the first after-injection according to the fuel spray formed by the second after-injection, similar to the main injection of Embodiment 1. Accordingly, the time for mixing between fuel and air by the first after-injection and the second after-injection can be lengthened. Hence, since the mixing between fuel and air proceeds during combustion, generation of soot can be suppressed.

Figure 11:
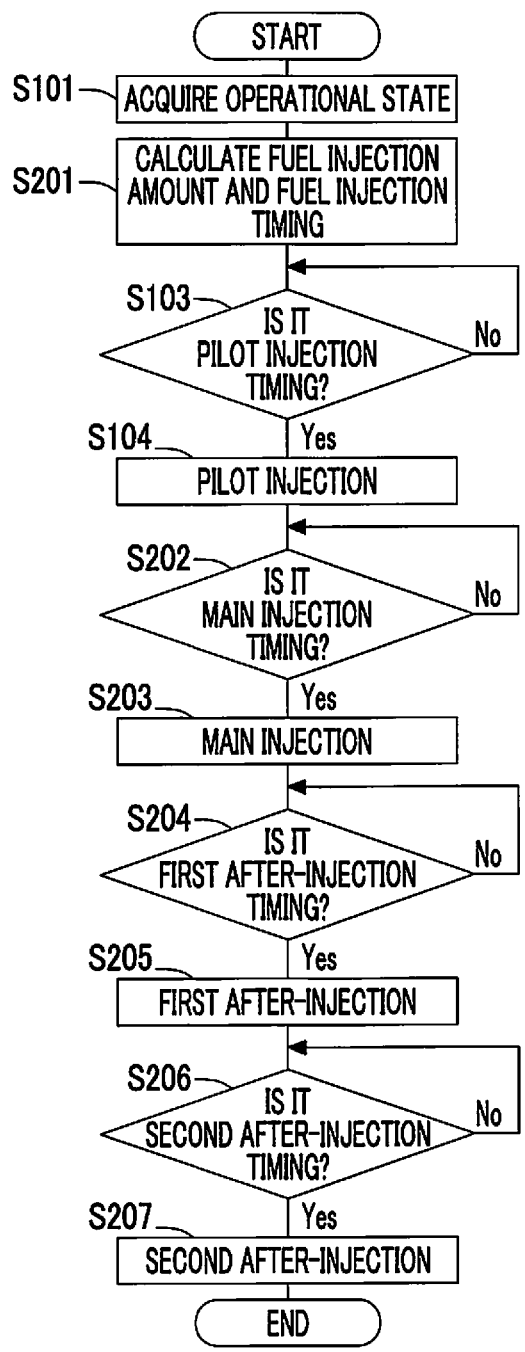
FIG. 11 is a flowchart illustrating a control flow of fuel injection related to Embodiment 2.

FIG. 11 is a flowchart illustrating a control flow of fuel injection related to Embodiment 2. The flowchart is executed in each cycle of each cylinder 2 by the ECU 10 in Region 2. Steps where the same processing as that of the flowchart illustrated in FIG. 9 is performed will be denoted by the same reference signs, and the description thereof will be omitted.

In the flowchart illustrated in FIG. 11, in a case where the processing of Step S101 is completed, the processing proceeds to Step S201. In Step S201, the pilot injection amount, the pilot injection timing, the main injection amount, the main fuel injection timing, the first after-injection amount, the first after-injection timing, and the second after-injection amount are calculated on the basis of the operational state of the internal combustion engine 1. Maps or calculation formulas for obtaining the pilot injection amount, the pilot injection timing, the main injection amount, the main fuel injection timing, the first after-injection amount, the first after-injection timing, and the second after-injection amount, respectively, on the basis of the operational state of the internal combustion engine 1 are obtained in advance by experiment or simulation and are stored in the ECU 10. The second after-injection timing is calculated by adding the aforementioned time difference T2 to the first after-injection timing. In addition, the first after-injection amount and the second after-injection amount may be the same amounts or may be different amounts.

Additionally, in the flowchart illustrated in FIG. 11, in a case where the processing of Step S104 is completed, the processing proceeds to Step S202. In Step S202, it is determined whether or not there is the main injection timing. In a case where the determination is positive in Step S202, the processing proceeds to Step S203 where the main injection is carried out. Since the main injection is carried out from the second injection hole 41B, the ECU 10 gives a command signal to the inner needle valve gear 43A for a time according to the main injection amount. On the other hand, in a case where the determination is negative in Step S202, Step S202 is executed again.

In Step S204, it is determined whether or not there is the first after-injection timing. In a case where the determination is positive in Step S204, the processing proceeds to Step S205 where the first after-injection is carried out. Since the first after-injection is carried out from the first injection hole 41A, the ECU 10 gives a command signal to the outer needle valve gear 42A for a time according to the first after-injection amount. On the other hand, in a case where the determination is negative in Step S204, Step S204 is executed again.

In Step S206, it is determined whether or not there is the second after-injection timing. In a case where the determination is positive in Step S206, the processing proceeds to Step S207 where the second after-injection is carried out. Since the second after-injection is carried out from the second injection hole 41B, the ECU 10 gives a command signal to the inner needle valve gear 43A for a time according to the second after-injection amount. On the other hand, in a case where the determination is negative in Step S206, Step S206 is executed again.

In addition, in the present embodiment, the pilot injection is performed from the second injection hole 41B. Instead of this, however, the pilot injection may be carried out from the first injection hole 41A. In addition, in the present embodiment, the main injection is performed from the second injection hole 41B. Instead of this, however, the main injection may be carried out from the first injection hole 41A. Additionally, in the present embodiment, the first after-injection is performed before the second after-injection. However, the second after-injection may be performed before the first after-injection by changing the order. However, by changing an injection hole for performing the after-injection first to an injection hole for performing the main injection as illustrated in FIG. 10, the influence of pulsation of fuel generated at the time of the main injection at the time of the after-injection can be suppressed. Therefore, this is even better.

As described above, according to the present embodiment, expansion of combustion at an early stage can be suppressed by shifting the first after-injection and the second after-injection such that the portion of the fuel spray of the first after-injection and the portion of the fuel spray of the second after-injection overlap each other at the position apart by the predetermined distance L1 from the side wall 31A of the cavity 31. Therefore, combustion can be expanded after the mixing between fuel and air has proceeded. Accordingly, generation of soot can be suppressed.

(Embodiment 3)

In the present embodiment, in Region 2, the main injection and the after-injection are performed in a divided manner from the first injection hole 41A and the second injection hole 41B. Since the other devices are the same as those of Embodiment 1, the description thereof is omitted.

Figure 12:
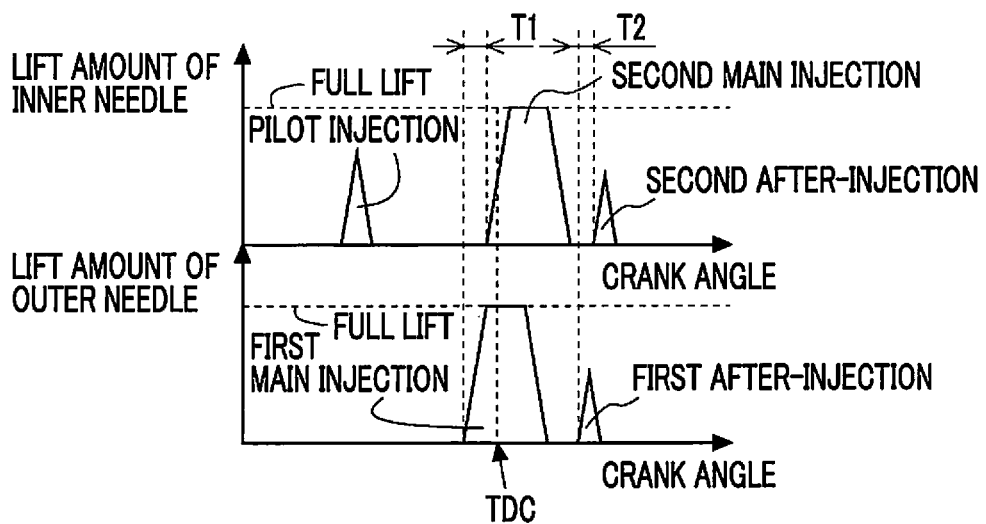
FIG. 12 is a view illustrating a relationship between the lift amounts of the outer needle and the inner needle and, the crank angle related to Embodiment 3.

FIG. 12 is a view illustrating a relationship between the lift amounts of the outer needle 42 and the inner needle 43 and, the crank angle related to the present embodiment. The lift amount of the inner needle 43 increases in response to the pilot injection, the second main injection, and the second after-injection, and the lift amount of the outer needle 42 increases in response to the first main injection and the first after-injection. That is, although the main injection and the after-injection are carried out from both the first injection hole 41A and the second injection hole 41B, the pilot injection is carried out only from the second injection hole 41B. In the present embodiment, the lift amount of the outer needle 42 starts to increase before the lift amount of the inner needle 43 starts to increase in the main injection and the after-injection. A time difference of points of time when the lift amounts of the inner needle 43 and the outer needle 42, respectively, in the main injection start to increase is T1, and a time difference of points of time when of the lift amounts of the inner needle 43 and the outer needle 42, respectively, in the after-injection start to increase is T2.

Thus, since expansion of the combustion of fuel by the first main injection and the first after-injection can be suppressed, the time for mixing between fuel and air by the first main injection, the second main injection, the first after-injection, and the second after-injection can be lengthened. Hence, since the mixing between fuel and air by the respective injections proceeds during combustions, generation of soot can be suppressed.

In addition, in the present embodiment, the pilot injection is performed from the second injection hole 41B. Instead of this, however, the pilot injection may be carried out from the first injection hole 41A. Additionally, in the present embodiment, the first main injection is performed before the second main injection. However, the second main injection may be performed before the first main injection by changing the order. Additionally, in the present embodiment, the first after-injection is performed before the second after-injection. However, the second after-injection may be performed before the first after-injection by changing the order.

(Embodiment 4)

Figure 13:
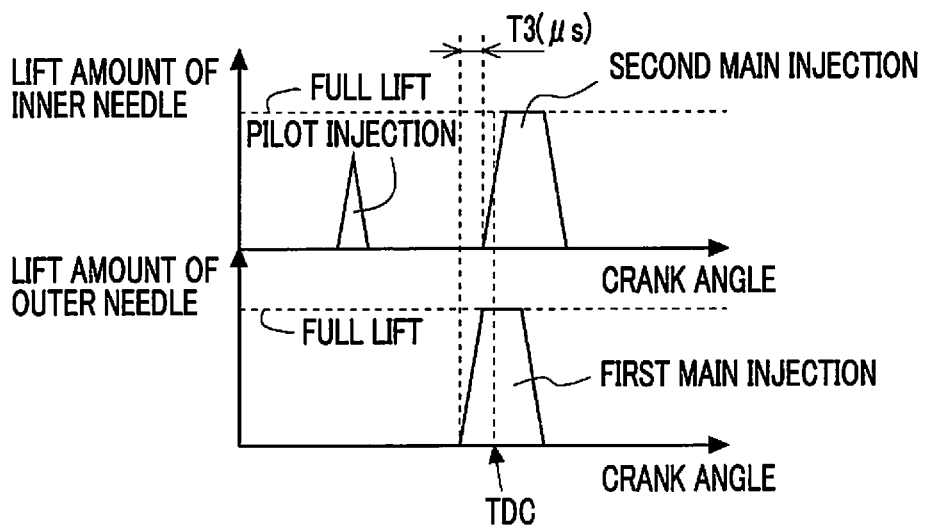
FIG. 13 is a view illustrating a relationship between the lift amounts of the outer needle and the inner needle and, the crank angle related to Embodiment 4.

In the present embodiment, in Region 3, the first main injection and the second main injection are carried out, and the after-injection is not carried out. Since the other devices are the same as those of Embodiment 1, the description thereof is omitted. In the present embodiment, the lift amount of the outer needle 42 starts to increase before the lift amount of the inner needle 43 starts to increase in the main injection. FIG. 13 is a view illustrating a relationship between the lift amounts of the outer needle 42 and the inner needle 43 and, the crank angle related to the present embodiment. A time difference of points of time when the lift amounts of the inner needle 43 and the outer needle 42, respectively, in this main injection start to increase is illustrated by T3 in FIG. 13. In Region 3, since the temperature within the cavity 31 is higher than that in Region 2, the time difference T1 in Region 2 and the time difference T3 in Region 3 are set to different values. In this way, even in a case where the after-injection is not carried out, expansion of combustion at an early stage can be suppressed by shifting the first main injection and the second main injection. Therefore, combustion can be made after the mixing between fuel and air has proceeded. Accordingly, generation of soot can be suppressed. The time difference T3 in the embodiment is equivalent to a predetermined time or a predetermined main delay time in the present disclosure.

(Embodiment 5)

Figure 14:
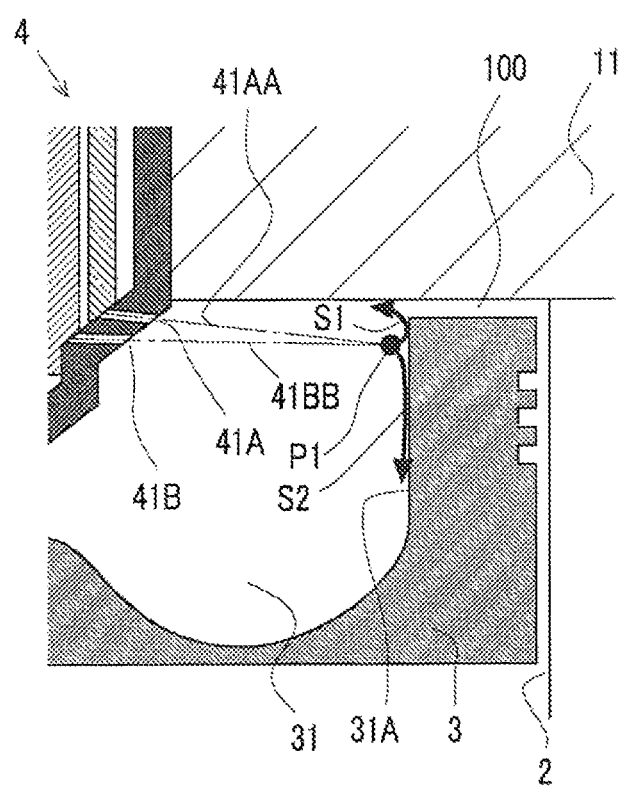
FIG. 14 is a view illustrating fuel sprays divided in a predetermined ratio.

In the present embodiment, the amounts of fuel after being injected from the first injection hole 41A and the second injection hole 41B and overlap each other is a predetermined ratio, and the first injection hole 41A and the second injection hole 41B are formed so as to be divided into a bottom part side (that is, a bottom part side of the cavity 31) of the piston 3 and a top part side (that is, a cylinder head 11 side) of the piston 3. FIG. 14 is a view illustrating fuel sprays divided in a predetermined ratio. A fuel spray that faces the top part side of the piston 3 is illustrated by S1, and a fuel spray that faces the bottom part side of the piston 3 is illustrated by S2.

When the piston 3 is located in the vicinity of the top dead center, the squish area 100 is formed between a top part surface of the piston 3, and the cylinder head 11. Since the volume of the squish area 100 becomes small with the ascent of the piston 3, an airflow is generated from the squish area 100 toward the central axis 4A side. When the fuel injected from the first injection hole 41A and the second injection hole 41B is stirred by the airflow from the squish area 100, the mixing between air and fuel is promoted. That is, after the expansion of combustion is suppressed at an intersection P1 and before the combustion is expanded, division into the fuel spray S1 that faces the top part side of the piston 3, and the fuel spray S2 that faces the bottom part side of the piston 3 is made. Also, since combustion of the fuel spray S1 that faces the top part side of the piston 3 is expanded after the mixing between fuel and air is further promoted by the airflow from the squish area 100, the amount of generation of soot can be reduced.

Meanwhile, since fuel concentration becomes high on the top part side of a piston 3 if the amount of fuel that faces the top part side of the piston 3 increases excessively, there is a concern that air may run short. Hence, by setting the directions of the first injection hole 41A and the second injection hole 41B such that fuel is divided in a predetermined ratio to the top part side and the bottom part side of the piston 3, it is possible to suppress a situation in which the fuel concentration on the top part side of the piston 3 becomes excessively high, and the air that is present on the bottom part side of the cavity 31 can also be used effectively. Also, since combustion of the fuel spray S2 that faces the bottom part side of the piston 3 is also expanded after the mixing between fuel and air is promoted using the air that is present on the bottom part side of the piston 3, the amount of generation of soot can be reduced.

In this way, since the mixing with air and fuel can be further promoted before the combustion of fuel is expanded, generation of soot can be suppressed. The predetermined ratio can be obtained as an optimum value by experiment or simulation, and is, for example, 1 to 1.

What is claimed is:

1. An internal combustion engine comprising:
   an electronic control unit;
   a piston including a cavity configured to cause the internal combustion engine to perform compression self-ignition combustion; and
   a fuel injection valve configured to inject fuel toward a side wall of the cavity,
   wherein the fuel injection valve includes a first injection hole for injecting fuel, a second injection hole for injecting fuel, a first needle configured to open and close the first injection hole, and a second needle configured to open and close the second injection hole, wherein the first injection hole and the second injection hole are configured such that a portion of a fuel spray injected from the first injection hole and a portion of a fuel spray injected from the second injection hole overlap each other at a position apart at a predetermined distance from the side wall of the cavity, and wherein the electronic control unit is configured to control operation of the first needle independently from operation of the second needle such that the second needle starts operation in order to open the second injection hole after a predetermined time has elapsed from a point of time when the first needle starts operation in order to open the first injection hole.

2. The internal combustion engine according to claim 1, wherein the first injection hole and the second injection hole are configured such that a ratio of an amount of fuel that faces a top part side of the piston and an amount of fuel that faces a bottom part side of the piston becomes a predetermined ratio after the fuel sprays hit the side wall of the cavity.

3. The internal combustion engine according to claim 1, wherein the electronic control unit is configured to control the operation of the first needle and the second needle such that fuel injection from the fuel injection valve is carried out in a divided manner into fuel injection from the first injection hole and fuel injection from the second injection hole, and wherein the predetermined time is obtained in association with an accelerator operation amount and a cetane number for fuel being injected by the fuel injection valve.

4. The internal combustion engine according to claim 1, wherein the electronic control unit is configured to control the first needle and the second needle so as to perform main injection, and after-injection that is fuel injection after the main injection is performed, from the fuel injection valve, wherein the electronic control unit is configured to control the first needle and the second needle so as to perform the main injection in a divided manner into the fuel injection from the first injection hole and the fuel injection from the second injection hole, and wherein the electronic control unit is configured to control the operation of the first needle and the second needle so as to start the operation of the second needle in order to open the second injection hole after the predetermined time has elapsed from a point of time when the first needle starts operation in order to open the first injection hole in the main injection.

5. The internal combustion engine according to claim 1, wherein the electronic control unit is configured to control the first needle and the second needle so as to perform main injection, and after-injection that is fuel injection after the main injection is performed, from the fuel injection valve, wherein the electronic control unit is configured to control the first needle and the second needle so as to perform the after-injection in a divided manner into the fuel injection from the first injection hole and the fuel injection from the second injection hole, and wherein the electronic control unit is configured to control the operation of the first needle and the second needle so as to start the operation of the second needle in order to open the second injection hole after the predetermined time has elapsed from a point of time when the first needle starts operation in order to open the first injection hole in the after-injection.

* * * * *